United States Patent
Qian et al.

(10) Patent No.: US 6,827,047 B2
(45) Date of Patent: Dec. 7, 2004

(54) VEHICLE PROVIDED WITH INTERNAL COMBUSTION ENGINE AND FUEL REFORMING/SUPPLYING FUNCTIONS

(75) Inventors: Pu Qian, Saitama (JP); Kohjiroh Aimoto, Saitama (JP); Takahiro Gunji, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/318,384

(22) Filed: Dec. 13, 2002

(65) Prior Publication Data

US 2003/0168024 A1 Sep. 11, 2003

(30) Foreign Application Priority Data

Dec. 19, 2001 (JP) ........................................ 2001-385956
Dec. 19, 2001 (JP) ........................................ 2001-385957
Sep. 9, 2002 (JP) ........................................ 2002-262889

(51) Int. Cl.$^7$ ............................................. F02B 43/08
(52) U.S. Cl. ............................................. 123/3; 123/2
(58) Field of Search ......................................... 123/2, 3

(56) References Cited

U.S. PATENT DOCUMENTS 3,855,980 A * 12/1974 Weisz et al. .................... 123/3
4,876,989 A * 10/1989 Karpuk et al. .................. 123/3
6,318,306 B1 * 11/2001 Komatsu ........................ 123/3
2003/0047146 A1 * 3/2003 Daniel et al. ................... 123/3

FOREIGN PATENT DOCUMENTS

| JP | 52-98819 | 8/1977 |
| JP | 6-193447 | 7/1994 |
| JP | 2000-291499 | 10/2000 |

OTHER PUBLICATIONS

International Zeolite Association, 2000, http://www.zeolite-s.ethz.ch/Zeolites/StdAtlas.htm.*

* cited by examiner

Primary Examiner—Thomas Denion
Assistant Examiner—Zelalem Eshete
(74) Attorney, Agent, or Firm—Arent Fox PLLC (57) ABSTRACT

A vehicle has an internal combustion engine, which includes a reformer that reforms at least a portion of a liquid fuel by a dehydrogenating cyclization reaction to produce a reformed liquid fuel that is rich with aromatic hydrocarbon and has a high octane value as well as a reformed gaseous fuel that is rich with hydrogen. A gas-liquid separator is provided for separating the reformed liquid fuel and the reformed gaseous fuel from each other. Furthermore, a device is provided for supplying at least a portion of the reformed liquid fuel as a fuel to the internal combustion engine.

9 Claims, 6 Drawing Sheets

VEHICLE PROVIDED WITH INTERNAL COMBUSTION ENGINE AND FUEL REFORMING/SUPPLYING FUNCTIONS

BACKGROUND OF THE INVENTION

1. Field of the Invention

The present invention relates to a vehicle provided with an internal combustion engine that performs fuel-reforming/supplying functions.

2. Description of Related Art

A vehicle is known that includes a conventional fuel reformer e.g., see Japanese Patent Application Laid-open Nos. 52-98819 and 2000-291499.

In the conventional fuel reformer, a reformed fuel is gaseous in most cases, and the amount of a liquid component having a relatively high octane value obtained during a reforming process is relatively small. The gaseous fuel is extremely large in volume compared to a liquid fuel that provides an equivalent amount of heat. As a result, the efficiency of charging the fuel into the internal combustion engine deteriorates, making it difficult to increase the power output from the internal combustion engine. In addition, temporarily storing the gaseous fuel becomes difficult, so that it is difficult to apply the stored gaseous fuel in situations that require a large amount of fuel, such as during vehicle acceleration.

The conventional reformer obtains the heat needed to perform the reforming from an exhaust gas. Accordingly, the conventional reformer disadvantageously provides an unstable reforming reaction because the temperature of the exhaust gas fluctuates extensively depending on the operational state of the internal combustion engine.

Also, a known hybrid vehicle is provided with an internal combustion engine and a vehicle travel motor which uses a fuel cell as a power source.

The known hybrid vehicle suffers from a problem involving a method for supplying hydrogen to the fuel cell. For example, when a high-pressure storage vessel charged with hydrogen is mounted on the vehicle, the number of hydrogen-supply stations are limited because facilities for supplying high-pressure hydrogen are not widespread. Although an attempt has been made to reform hydrocarbon fuel using a steam reforming process and/or a partially oxidizing reaction to produce hydrogen, such reactions disadvantageously require a rather high temperature of 700 to 1,000° C., and carbon monoxide contained in the thus-produced hydrogen greatly deteriorates the performance of the fuel cell. For these reasons, a device for removing the carbon monoxide from the produced hydrogen is disadvantageously required, resulting in a complex system.

Further, mounted in a vehicle is a known premixing and compression/ignition-type internal combustion engine in which a mixture comprising an oxygen-containing gas and a fuel is compressed and ignited by itself. In the known premixing and compression/ignition-type internal combustion engine, an extremely lean air-fuel mixture can be burned, and a homogeneous air-fuel mixture is used as a fuel. From this perspective, the known premixing and compression/ignition-type internal combustion engine has attracted public notice as an internal combustion engine that can achieve high burning efficiency and reduce the amount of harmful substances contained in the exhaust gas. In the known premixing and compression/ignition-type internal combustion engine, fuel ignition is conducted by the fuel itself. For this reason, it is difficult to control ignition timing as desired because the fuel self-igniting phenomenon is governed by the chemical reactivity of the fuel and a pressure/temperature rising hysteresis generated by the compression of the air-fuel mixture.

Therefore, there is proposed a method for adjusting the ignition timing by re-circulating a gas which has undergone burning as an intake gas, e.g., see Japanese Patent Application Laid-open No. 6-193447.

However, the method for re-circulating the burned gas as the intake gas suffers from the difficulty of not being able to promptly control ignition timing in accordance with the operational state of the premixing and compression/ignition-type internal combustion engine.

SUMMARY OF THE INVENTION

It is an object of the present invention to at least overcome the above-described drawbacks of the related art.

It is also an object of the present invention to provide a vehicle wherein a reformed liquid fuel containing a large amount of a component having a high octane value is produced to enhance the energy efficiency of an internal combustion engine.

To achieve the above objects, according to the present invention, there is provided a vehicle that is provided with an internal combustion engine and that performs fuel-reforming/supplying functions. The internal combustion engine includes a reformer that reforms at least a portion of liquid fuel using a dehydrogenating cyclization reaction to produce a reformed liquid fuel, that is rich with aromatic hydrocarbon and has a high octane value, as well as a reformed gaseous fuel that is rich with hydrogen. The internal combustion engine also includes a gas-liquid separator that separates the reformed liquid fuel and the reformed gaseous fuel from each other, and a device to supply at least a portion of the reformed liquid fuel as a fuel to the internal combustion engine.

The dehydrogenating cyclization reaction produces a reformed liquid fuel that is rich with aromatic hydrocarbon and has a high octane value from the liquid fuel containing a hydrocarbon with a low octane value, thereby enhancing the energy efficiency of the internal combustion engine.

It is another object of the present invention to provide a vehicle with a stabilized reforming reaction.

To achieve this object, according to the present invention, there is provided a vehicle that is provided with an internal combustion engine and that performs fuel-reforming/supplying functions. The internal combustion engine includes a device that supplies at least a portion of the reformed gaseous fuel to a burning-type heater of the reformer.

While producing the aromatic hydrocarbon, a reformed gaseous fuel that is rich with hydrogen is also produced. The reformed gaseous fuel is separated from the reformed liquid fuel, and at least a portion thereof supplied as a fuel to the heating gas burning-type heater of the reformer. Therefore, the reforming reaction in the reformer is stabilized.

It is yet another object of the present invention to provide a vehicle having a high energy efficient internal combustion engine and fuel cell.

To achieve this object, according to the present invention, there is provided a vehicle that is provided with an internal combustion engine and a fuel cell, and that performs fuel-reforming/supplying functions. The internal combustion engine includes a reformer that reforms at least a portion of a liquid fuel using a dehydrogenating cyclization reaction to produce a reformed fuel, that is rich with aromatic hydrocarbon and has a high octane value, as well as produces hydrogen. The internal combustion engine also includes a hydrogen separator that separates hydrogen from the reformed fuel, a device to supply at least a portion of the reformed fuel as a fuel to the internal combustion engine. The engine also includes a device to supply the separated hydrogen as a fuel to the fuel cell.

The dehydrogenating cyclization reaction is generated at a relatively low temperature from 400 to 700° C. and hence, it is possible to simplify the reformer. Because no carbon monoxide is produced during the dehydrogenating cyclization reaction, a carbon monoxide-removing device is not required to supply the produced hydrogen as the fuel to the fuel cell. The energy efficiency of the internal combustion engine is enhanced by using, as a fuel for the internal combustion engine, the concurrently-produced reformed fuel that is rich with aromatic hydrocarbon and contains a component having a high octane value.

It is a further object of the present invention to provide a vehicle wherein the ignition timing is promptly controlled in response to the operational state of a premixing and compression/ignition-type internal combustion engine.

To achieve this object, according to the present invention, there is provided a vehicle which performs fuel-reforming/supplying functions and includes a premixing and compression/ignition-type internal combustion engine in which a mixture has an oxygen-containing gas and a fuel that is compressed and self-ignited, a device to supply a liquid fuel which is not reformed to the premixing and compression/ignition-type internal combustion engine, a reformer to reform the liquid fuel using a dehydrogenating cyclization reaction to produce a liquid fuel that is rich with aromatic hydrocarbon and has a high octane value, and a device to supply the liquid fuel having the high octane value as a fuel to the premixing and compression/ignition-type internal combustion engine.

With the reformer, liquid fuels having different combustibilities are produced in the vehicle, and the liquid fuel resulting from the reforming as well as the liquid fuel before being reformed are supplied at any proportion to the premixing and compression/ignition-type internal combustion engine. Therefore, the proportion of the two liquid fuels to be supplied can be promptly changed in response to the operational state of the premixing and compression/ignition-type internal combustion engine in order to control the ignition timing of the premixing and compression/ignition-type internal combustion engine.

DETAILED DESCRIPTION OF THE PREFERRED EMBODIMENTS

Figure 1:
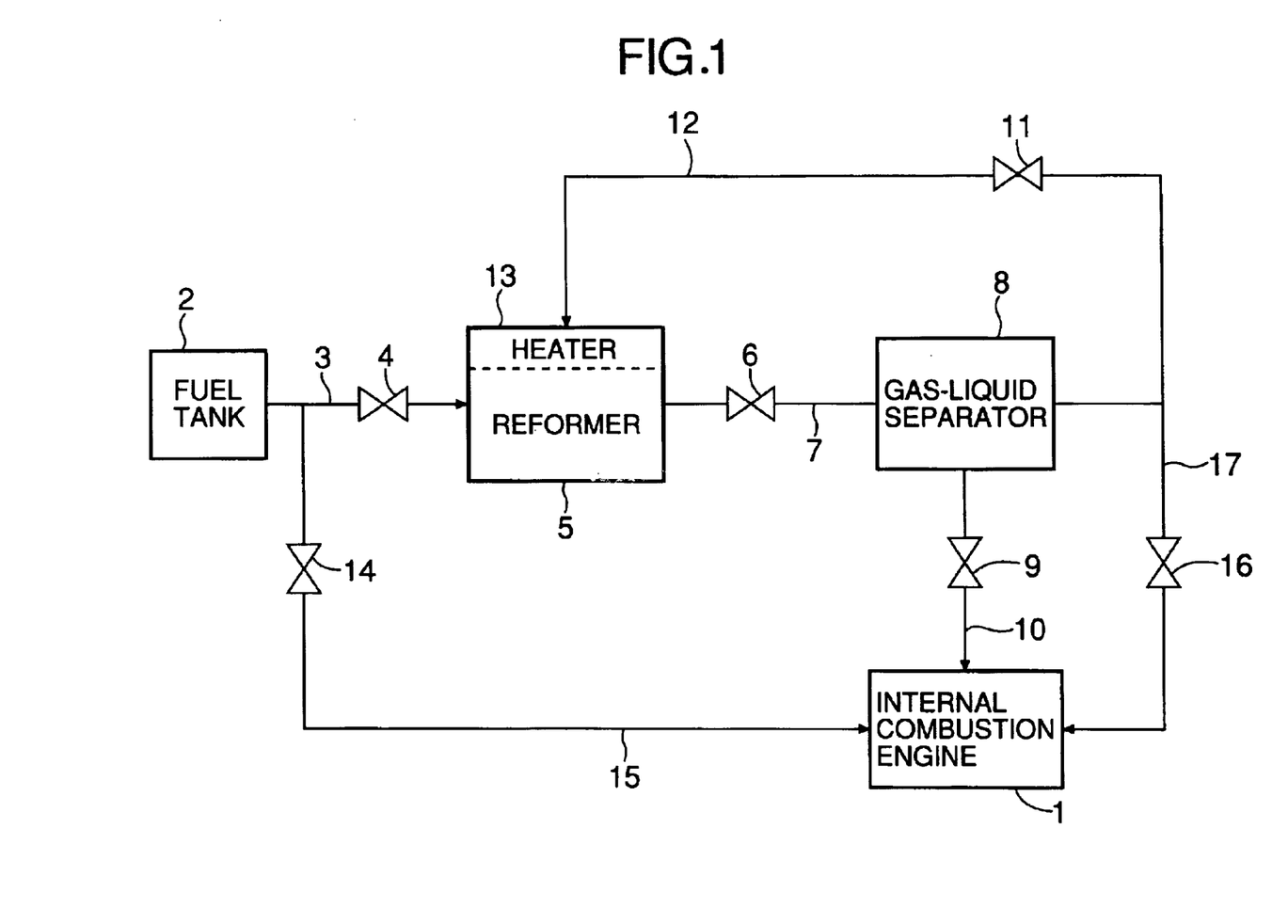
FIG. 1 is a schematic diagram of a fuel supplying system according to a first embodiment of the present invention.

According to a first embodiment and as shown in FIG. 1, a fuel supplying system in a vehicle provided with an internal combustion engine includes a fuel tank 2 connected to an inlet of a reformer 5 through a feed pipe 3 having an on-off valve 4. An outlet of the reformer 5 is connected to an inlet of a gas-liquid separator 8 through a feed pipe 7 having an on-off valve 6. A first outlet of the gas-liquid separator 8 is connected to a fuel-introducing side of the internal combustion engine 1 through a feed pipe 10 having an on-off valve 9. A second outlet of the gas-liquid separator 8 is connected to a heating gas-burning type heater 13 of the reformer 5 through a feed pipe 12 having an on-off valve 11. A portion of the feed pipe 3 between the fuel tank 2 and the on-off valve 4, and the fuel-introducing portion of the internal combustion engine 1 are connected to each other through a feed pipe 15 having an on-off valve 14. Furthermore, a portion of the feed pipe 12 between the gas-liquid separator 8 and the on-off valve 11, and the fuel-introducing portion of the internal combustion engine 1 are connected to each other through a feed pipe 17 having an on-off valve 16.

Liquid fuel is stored in the fuel tank 2. The reformer 5 contact-reforms the liquid fuel using a dehydrogenating cyclization reaction, thereby producing, from the liquid fuel, a reformed liquid fuel, that is rich with aromatic hydrocarbons and has a high octane value, as well as a reformed gaseous fuel that is rich with hydrogen. The reformed gaseous fuel contains, in addition to hydrogen, paraffinic hydrocarbons such as, for example only, methane, ethane, propane and other well-known paraffinic hydrocarbons.

The gas-liquid separator 8 separates the reformed liquid fuel and the reformed gaseous fuel from each other and supplies at least a portion of the reformed liquid fuel to the internal combustion engine 1 and supplies at least a portion of the reformed gaseous fuel to the gas-burning type heater 13 of the reformer 5. Further, the gas-liquid separator 8 supplies at least a portion of the reformed gaseous fuel to the internal combustion engine 1. Although the gas-liquid separator 8 is described in this embodiment as having gas-liquid separating and fuel-supplying functions, it is within the scope of this invention to conduct the fuel supply function using any other suitable device.

A catalyst for promoting the dehydrogenating cyclization reaction is provided in the reformer 5. Preferably, the catalyst is, for example only, a crystalline aluminosilicate such as zeolite, particularly,ZSM-5 zeolite having an MFI structure. More preferably, the catalyst contains at least one element selected from gallium, zinc and platinum. The temperature for the dehydrogenating cyclization reaction should be set in a range of 400 to 700° C.

Table 1 shows results of the reforming by the dehydrogenating cyclization reaction using gallium-modified ZSM-5 (Ga-ZSN-5) and zinc-modified ZSM-5 (Zn-ZSM-5) each as a catalyst and using n-pentane as a fuel. Each amount of gallium and zinc was set at 2% by weight of the weight of the catalyst. The reforming conditions were as follows: the weight space speed (WHSV) was 2 $hr^{-1}$; the reforming temperature was 550° C.; and the reforming pressure was 0.1 MPa.

TABLE 1

| | Constituent of reformed fuel (% by weight) | | |
|---|---|---|---|
| Catalyst | Hydrogen | Paraffinic hydrocarbon gas | Aromatic hydrocarbon |
| H-ZSM-5 | 2.0 | 54.9 | 43.1 |
| Ga-ZSM-5 | 3.0 | 46.4 | 50.6 |
| Zn-ZSM-5 | 3.6 | 44.8 | 51.6 |

It is apparent from Table 1 that if H-ZSM-5 is used as a catalyst, the dehydrogenating cyclization reaction sufficiently advances. It is also seen that if a catalyst that is modified by gallium or zinc is used, the yields of aromatic hydrocarbon and hydrogen are increased more than when H-ZSM-5 is used.

In the above-described structure, in a state in which the on-off valve 4 is opened and the on-off valve 14 is closed, the liquid fuel is supplied from the liquid fuel tank 2 to the inlet of the reformer 5 through the feed pipe 3. In this case, the liquid fuel may be supplied, without being reformed, to the internal combustion engine by opening the on-off valve 14. In the reformer 5, a reformed fuel including a reformed liquid fuel, that is rich with aromatic hydrocarbons and has a high octane value, and a reformed gaseous fuel that is rich with hydrogen are produced by the dehydrogenating cyclization reaction of the liquid fuel. The reformed fuel is supplied from the reformer 5 through the feed pipe 7 to the gas-liquid separator 8 with the on-off valve 6 opened. In the gas-liquid separator 8, the reformed fuel is separated into the reformed liquid fuel and the reformed gaseous fuel, and the reformed liquid fuel is supplied through the feed pipe 10 to the internal combustion engine 1 with the on-off valve 9 opened.

On the other hand, the reformed gaseous fuel is supplied to the heating gas-burning type heater 13 for the reformer 5 through the feed pipe 12 with the on-off valve 11 opened and with the on-off valve 16 closed. In this case, a portion of the reformed gaseous fuel may be supplied to the internal combustion engine 1 through the feed pipe 17 with the on-off valve 16 opened. Heat from the exhaust gas of the internal combustion engine 1 may be used as a heat source to heat the reformer 5 along with the gas-burning type heater 13.

Figure 2:
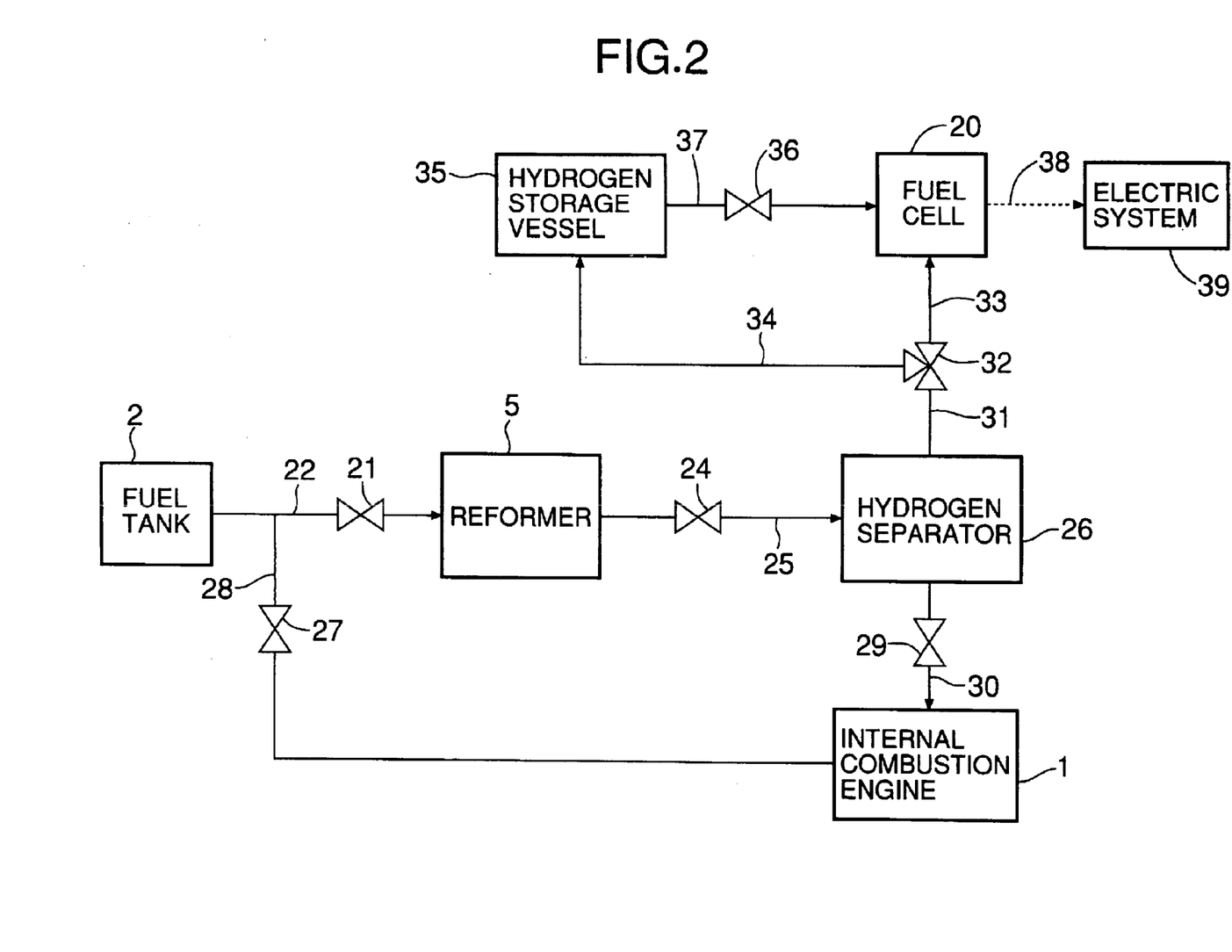
FIG. 2 is a schematic diagram of a fuel supplying system according to a second embodiment of the present invention.

According to a second embodiment and as shown in FIG. 2, a fuel supply system in a vehicle provided with an internal combustion engine 1 and a fuel cell 20 includes a fuel tank 2 connected to an inlet of a reformer 5 through a feed pipe 22 having an on-off valve 21. An outlet of the reformer 5 is connected to an inlet of a hydrogen separator 26 through a feed pipe 25 having an on-off valve 24. A portion of the feed pipe 22 between the fuel tank 2 and the on-off valve 21, and a fuel-introducing side of the internal combustion engine 1 are connected to each other through a feed pipe 28 having an on-off valve 27. A first outlet of the hydrogen separator 26 is connected to the fuel-introducing side of the internal combustion engine 1 through a feed pipe 30 having an on-off valve 29. A second outlet of the hydrogen separator 26 is connected to a first port of a three-way valve 32 through a feed pipe 31. A second port of the three way valve 32 is connected to a fuel inlet of the fuel cell 20 through a feed pipe 33. A third port of the three-way valve 32 is connected to an inlet of a hydrogen storage vessel 35 through a feed pipe 34. An outlet of the hydrogen storage vessel 35 is connected to the fuel inlet of the fuel cell 20 through a feed pipe 37 having an on-off valve 36. An output side of the fuel cell 20 is connected to an electric system 39 mounted in the vehicle through a conducting wire 38 and functions as a power source for the electric system 39. Included in the electric system 39 are, at a minimum and for example only, various lighting devices, an air conditioner, meters, and a vehicle travel motor.

Liquid fuel is stored in the fuel tank 2. The reformer 5 contact-reforms the liquid fuel, which is a starting material in a dehydrogenating cyclization reaction, thereby producing, from the liquid fuel, a reformed fuel, that is rich with aromatic hydrocarbons and has a high octane value, as well as produces hydrogen. The reformed gaseous fuel includes a liquid fuel and paraffinic hydrocarbons such as, for example only, methane, ethane, propane and other well-known paraffinic hydrocarbons.

The hydrogen separator 26 separates hydrogen from the reformed fuel and supplies the hydrogen to the fuel cell 20 and the reformed fuel to the internal combustion engine 1. Further, the hydrogen separator 26 also supplies at least a portion of the hydrogen to the hydrogen storage vessel 35. Although the hydrogen separator 26 has been described as performing the hydrogen-separating and fuel-supply functions, in this embodiment, it is within the scope of this invention to perform the fuel supply and hydrogen supply functions using other suitable devices, respectively. A vessel having a hydrogen-absorption material, such as a metal hydrate, carbon of a nano-structure and the like, is used as the hydrogen storage vessel 35. The fuel cell 20 may be of any well-known fuel cell so long as hydrogen is used as the fuel for the fuel cell.

A catalyst for promoting the dehydrogenating cyclization reaction is provided in the reformer 5. Preferably, the catalyst is, for example only, a crystalline aluminosilicate such as zeolite, particularly, ASM-5 zeolite having an MFI structure. More preferably, the catalyst contains at least one element selected from gallium, zinc and platinum. The temperature for the dehydrogenating cyclization reaction should be set in a range of 400 to 700° C.

Table 2 shows results of the reforming by the dehydrogenating cyclization reaction using proton-type ZSM-5 (H-ZSM-5), gallium-modified ZSM-5 (Ga-ZSN-5), and zinc-modified ZSM-5 (Zn-ZSM-5) each as a catalyst and using n-pentane as a fuel. Each amount of gallium and zinc was set at 2% by weight of the weight of the catalyst. The reforming conditions were as follows: the weight space speed (WHSV) was 2 $hr^{-1}$; the reforming temperature was 550° C.; and the reforming pressure was 0.1 MPa.

TABLE 2

| Catalyst | Constituent of reformed fuel (% by weight) | | |
|---|---|---|---|
| | Hydrogen | Paraffinic hydrocarbon gas | Aromatic hydrocarbon |
| H-ZSM-5 | 2.0 | 54.9 | 43.1 |
| Ga-ZSM-5 | 3.0 | 46.4 | 50.6 |
| Zn-ZSM-5 | 3.6 | 44.8 | 51.6 |

It is apparent from Table 2 that if H-ZSM-5 is used as a catalyst, the dehydrogenating cyclization reaction sufficiently advances. It is also seen that if a catalyst modified by gallium or zinc is used, the yields of aromatic hydrocarbons and hydrogen are increased more than when H-ZSM-5 is used.

In the above-described structure, in a state in which the on-off valve 21 is opened and the on-off valve 27 is closed, the liquid fuel is supplied from the fuel tank 2 to the inlet of the reformer 5 through the feed pipe 22. In this case, the fuel may be supplied, without being reformed, to the internal combustion engine 1 by opening the on-off valve 27. In the reformer 5, a reformed fuel, that is rich with aromatic hydrocarbons and has a high octane value, and hydrogen are produced by the dehydrogenating cyclization reaction of the liquid fuel. The reformed fuel and hydrogen are supplied from the outlet of the reformer 5 through the feed pipe 25 to the hydrogen separator 26 with the on-off valve 24 opened. In the hydrogen separator 26, the hydrogen is separated from the reformed fuel, and the resulting reformed fuel is supplied from the first outlet of the hydrogen separator 26 through the feed pipe 30 to the internal combustion engine 1 with the on-off valve 29 opened.

The hydrogen is supplied from the second outlet of the hydrogen separator 26 through the feed pipe 33 to the fuel cell 20 with the first and second ports of the three-way valve 32 connected to each other. The hydrogen is also supplied through the feed pipe 34 to the inlet of the hydrogen storage tank 35 with the first and third ports of the three-way valve zinc-modified ZSM-5 (Zn-ZSM-5) each as a catalyst and using n-pentane and n-heptane as fuels. Each amount of gallium and zinc was set at 2% by weight of the weight of the catalyst.

TABLE 3

| | | Reforming conditions | | | Constituent of reformed fuel (% by weight) | | |
|---|---|---|---|---|---|---|---|
| | Fuel | Weight space speed (WHSV) | Reforming temperature (° C.) | Reforming pressure (MPa) | Hydrogen | Paraffinic hydrocarbon gas | Aromatic hydrocarbon |
| H-ZSM-5 | n-pentane | 2 hr$^{-1}$ | 550 | 0.1 | 2.0 | 54.9 | 43.1 |
| Ga-ZSM-5 | n-pentane | 2 hr$^{-1}$ | 550 | 0.1 | 3.0 | 46.4 | 50.6 |
| Zn-ZSM-5 | n-pentane | 2 hr$^{-1}$ | 550 | 0.1 | 3.6 | 44.8 | 51.6 |
| Zn-ZSM-5 | n-heptane | 2 hr$^{-1}$ | 575 | 0.1 | 4.0 | 32.9 | 63.1 |

32 connected to each other. The hydrogen stored in the hydrogen storage tank 35 is supplied through the feed pipe 37 to the fuel cell 20 with the on-off valve 36 opened.

A power output from the fuel cell 20 is used to operate an electric system 39 mounted in the vehicle, thereby operating various features, such as, but in no way limiting, lighting devices, an air conditioner, meters, and a vehicle travel motor.

According to a third embodiment, a fuel supply system in a vehicle is provided with a premixing and a compression/ignition-type internal combustion engine as the internal combustion engine.

Figure 3:
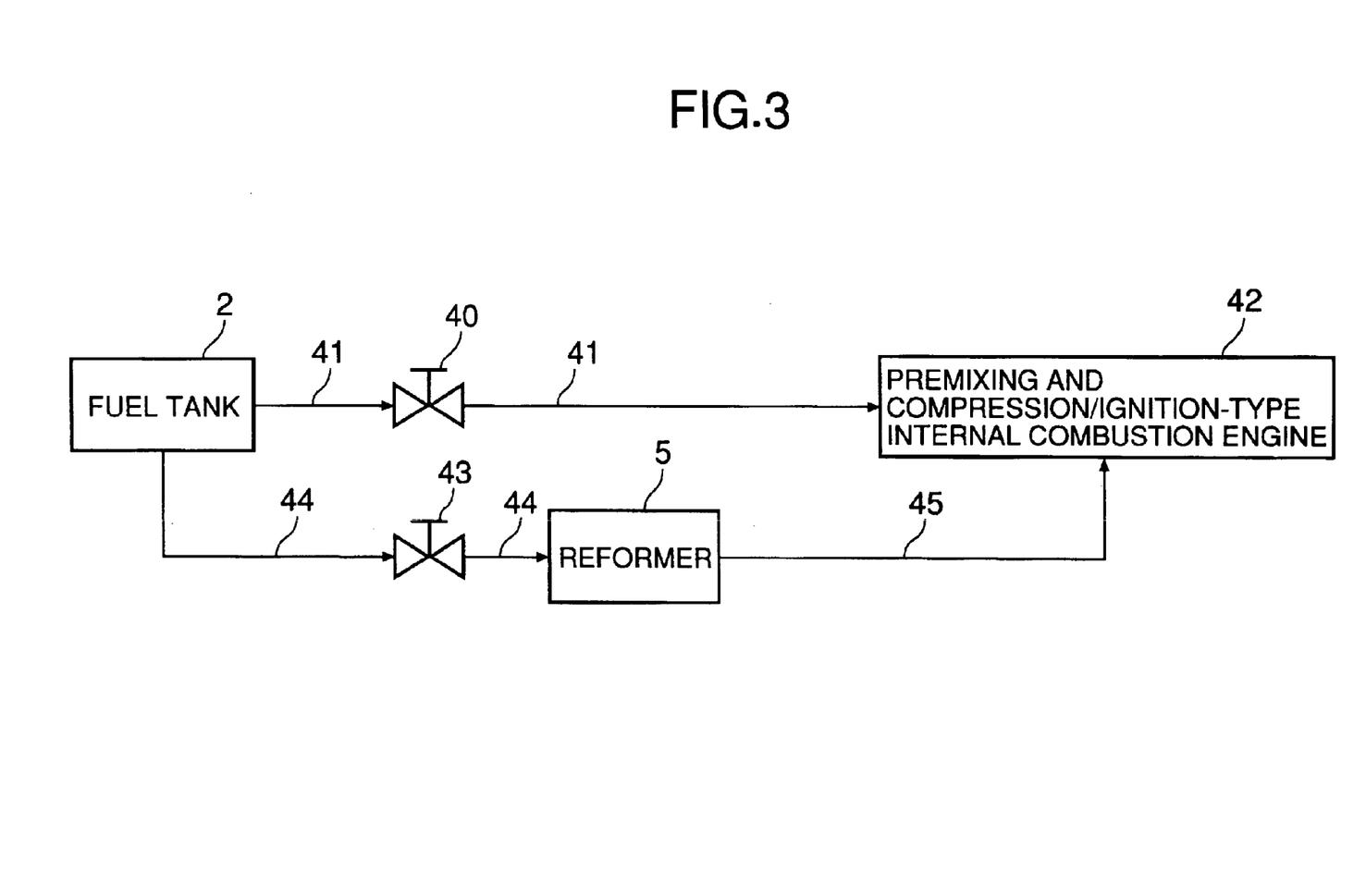
FIG. 3 is a schematic diagram of a fuel supplying system according to an example of a third embodiment of the present invention.

An example of the third embodiment is shown in FIG. 3, wherein a fuel tank 2 is connected to a premixing and compression/ignition-type internal combustion engine 42 through a first feed pipe 41 having a first regulator valve 40 having a degree of opening that is regulated. The fuel tank 2 is also connected to a reformer 5 through a second feed pipe 44 having a second regulator valve 43 having a degree of opening that is regulated. The reformer 5 is connected to the premixing and compression/ignition-type internal combustion engine 42 through a third feed pipe 45. Further, a gas containing oxygen, e.g., air is supplied to the premixing and compression/ignition-type internal combustion engine 42 by a supply device (not shown). A fuel for the internal combustion engine 42 is stored in the fuel tank 2. The fuel may be of any suitable type that can be used in the premixing and compression/ignition-type internal combustion engine 42 and reformed by the reformer 5 into a fluid fuel that is rich with aromatic hydrocarbon and has a high octane value by a dehydrogenating cyclization reaction. Generally speaking, a hydrocarbon is preferred as the fuel, particularly, a saturated hydrocarbon. An unsaturated hydrocarbon having a double bond and either one of alcohol or ether, which is an oxygen-containing compound, may also be used.

A catalyst for promoting the dehydrogenating cyclization reaction is provided in the reformer 5. Preferably, the catalyst is, for example only, a crystalline aluminosilicate such as zeolite, particularly, ZSM-5 zeolite having an MFI structure. More preferably, the catalyst contains at least one element selected from gallium, zinc and platinum. The temperature for the dehydrogenating cyclization reaction should be set in a range of 400 to 700° C.

Table 3 shows results of the reforming by the dehydrogenating cyclization reaction using proton-type ZSM-5 (H-ZSM-5), gallium-modified ZSM-5 (Ga-ZSN-5), and It is apparent from Table 3 that if n-pentane is used as a fuel and H-ZSM-5 is used as a catalyst, the dehydrogenating reaction sufficiently advances. It is also seen that if either one of Ga-ZSM-5 or Zn-ZSM-5 is used, the yields of aromatic hydrocarbons and hydrogen are substantially more than the yields when H-ZSM-5 is used. The same result occurs when H-ZSM-5, modified by platinum, is used. When n-heptane was used as a fuel and Ga-ZSM-5 was used as a catalyst, it was observed that the yields were more than the yields when n-pentane was used.

Referring again to FIG. 3, the liquid fuel in the fuel tank 2 is supplied without being reformed to the premixing and compression/ignition-type internal combustion engine 42 by opening the first regulator valve 40. The amount of supplied liquid fuel is regulated based on the degree the first regulator valve 40 is open. The liquid fuel in the fuel tank 2 is supplied to the reformer 5 by opening the second regulator valve 43 and is then reformed in the reformer 5. A liquid fuel resulting from the reforming, rich with aromatic hydrocarbons and having a high octane value, is supplied to the premixing and compression/ignition-type internal combustion engine 42 through the third feed pipe 46. The amount of liquid fuel supplied to the reformer 5 is regulated based on the degree the second regulator valve 43 is open. An igniting timing for the premixing and compression/ignition-type internal combustion engine 42 is regulated by regulating the degree the first regulator valve 40 and the second regulator valve 43 are open in accordance with the operational state of the premixing and compression/ignition-type internal combustion engine 42.

In this case, the first regulator valve 40 and the first feed pipe 41 form a device for supplying the liquid fuel which is not yet reformed (hereinafter referred to as "unreformed liquid fuel") to the premixing and compression/ignition-type internal combustion engine 42. The third feed pipe 45 forms a device for supplying the liquid fuel having the high octane value as a fuel to the premixing and compression/ignition-type internal combustion engine 42.

Further, the amount of unreformed liquid fuel supplied to the premixing and compression/ignition-type internal combustion engine 42 is regulated by the first regulator valve 40. The amount of reformed liquid fuel supplied to the premixing and compression/ignition-type internal combustion engine 42 is regulated by the third regulator valve 47. That is, the regulator valves 40 and 47 are devices for regulating the amounts of the supplied fuels, respectively. Therefore, the regulating devices provide the function of increasing the proportion of liquid fuel having a high octane value to be supplied to the premixing and compression/ignition-type internal combustion engine 42, when the engine 42 is operated under a high load, and the function of decreasing the proportion of liquid fuel having a high octane value to be supplied to the premixing and compression/ignition-type internal combustion engine 42, when the engine 42 is operated under a low load.

Figure 4:
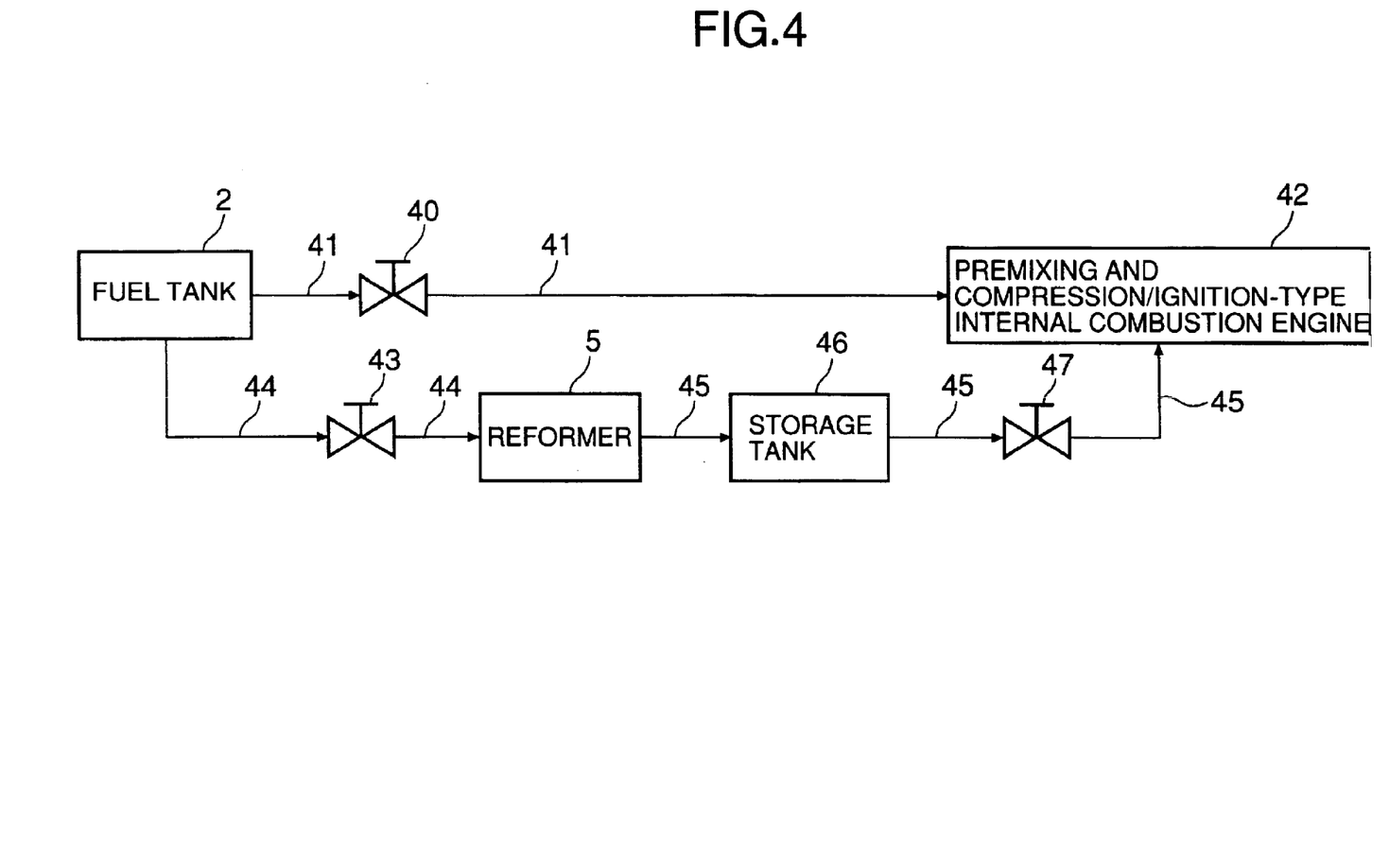
FIG. 4 is a schematic diagram of the fuel supplying system according to another example of the third embodiment.

Another example of the third embodiment of the fuel supplying system is shown in FIG. 4, which is similar to the example shown in FIG. 3, except that it further includes a storage tank 46 for temporarily storing the reformed liquid fuel and a third regulator valve 47 sequentially provided on a third feed pipe 45 from the reformer 5. The arrangement of the other components is the same as in the system shown in FIG. 3. If the storage tank 46 is provided as mentioned above, it is possible to more promptly respond to the change in the operational state of a premixing and compression/ignition-type internal combustion engine 42. The amount of reformed liquid fuel supplied to the internal combustion engine 42 is regulated by the degree the third regulator valve 47 is open.

In this case, the first regulator valve 40 and the first feed pipe 41 form a device for supplying the unreformed liquid fuel to the premixing and compression/ignition-type internal combustion engine 42. The third feed pipe 45, the storage tank 46, and the third regulator valve 47 form a device for supplying the liquid fuel having the high octane value as a fuel to the premixing and compression/ignition-type internal combustion engine 42.

Further, the amount of unreformed liquid fuel supplied to the premixing and compression/ignition-type internal combustion engine 42 is regulated by the first regulator valve 40. The amount of reformed liquid fuel supplied to the premixing and compression/ignition-type internal combustion engine 42 is regulated by the third regulator valve 47. That is, the regulator valves 40 and 47 are devices for regulating the amounts of the supplied fuels, respectively. Therefore, the regulating devices provide the function of increasing the proportion of liquid fuel having a high octane value to be supplied to the premixing and compression/ignition-type internal combustion engine 42, when the engine 42 is operated under a high load, and the function of decreasing the proportion of liquid fuel having a high octane value to be supplied to the premixing and compression/ignition-type internal combustion engine 42, when the engine 42 is operated under a low load.

Figure 5:
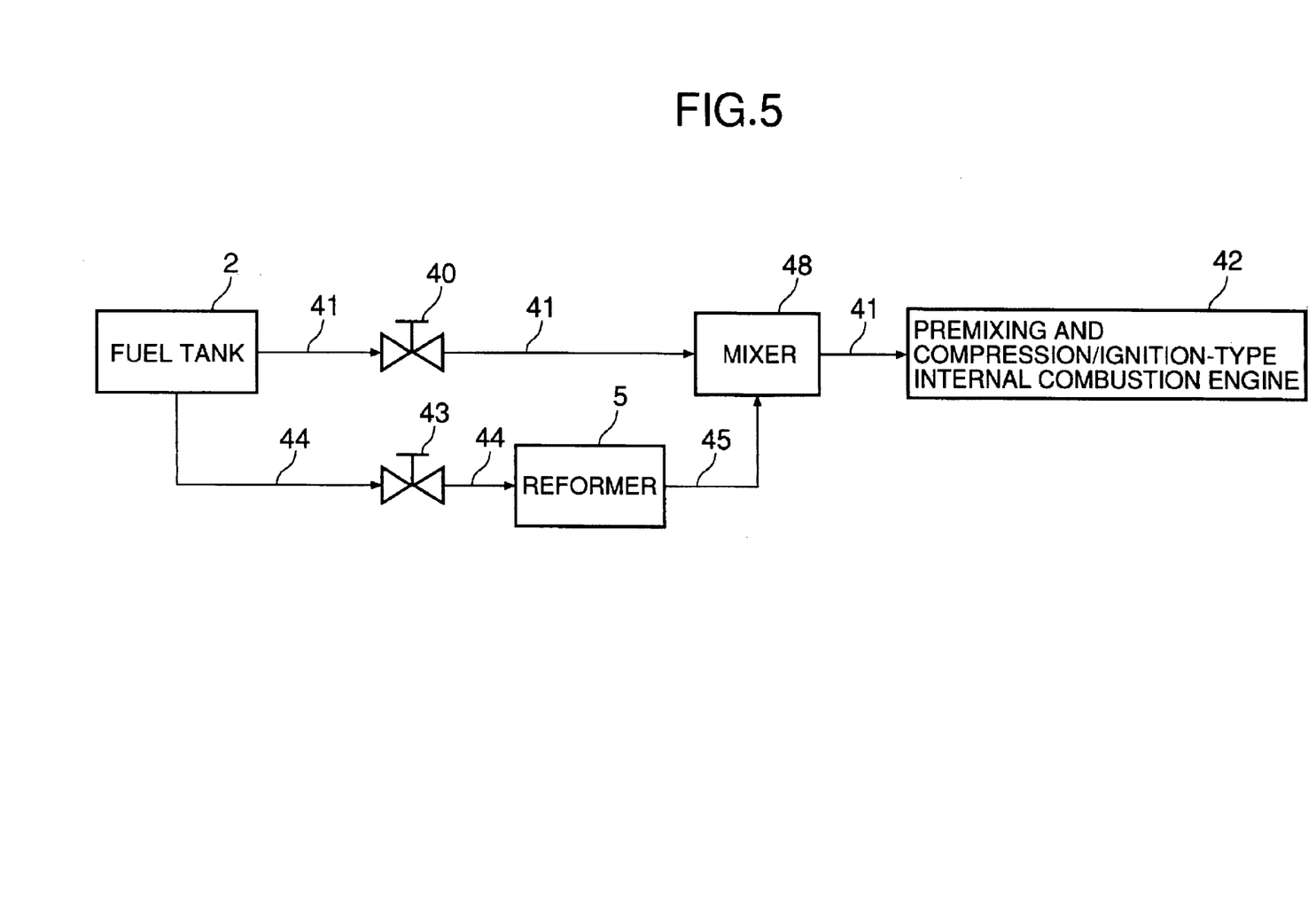
FIG. 5 is a schematic diagram of the fuel supplying system according to another example of the third embodiment.

Another example of the third embodiment of the fuel supplying system is shown in FIG. 5 and includes a mixer 48 provided between a first regulator valve 40 and a premixing and compression/ignition-type internal combustion engine 42 on a first feed pipe 41, and a third feed pipe 45 extending from a reformer 5 and connected to the mixer 48. The arrangement of the other components is the same as in the system shown in FIG. 3.

If the system is arranged in this manner, the unreformed liquid fuel and the reformed liquid fuel are previously mixed and then supplied to the premixing and compression/ignition-type internal combustion engine 42.

In this case, the first regulator valve 40, the first feed pipe 41, and the mixer 48 form a device for supplying the unreformed liquid fuel to the premixing and compression/ignition-type internal combustion engine 42. In addition, the third feed pipe 45, the mixer 48, and a portion of the first feed pipe 41 form a device for supplying the liquid fuel having the high octane value as a fuel to the premixing and compression/ignition-type internal combustion engine 42.

Further, the amount of unreformed liquid fuel supplied to the premixing and compression/ignition-type internal combustion engine 42 is regulated by the first regulator valve 40. The amount of reformed liquid fuel supplied to the premixing and compression/ignition-type internal combustion engine 42 is regulated by the second regulator valve 43. That is, the valves 40 and 43 are devices for regulating the supplied amounts, respectively. Therefore, the regulating devices have functions to increase the proportion of liquid fuel having the high octane value that is supplied to the premixing and compression/ignition-type internal combustion engine 42, when the engine 42 is operated under a high load, and to decrease the proportion of liquid fuel having the high octane value that is supplied to the premixing and compression/ignition-type internal combustion engine 42, when the engine 42 is operated under a low load.

Figure 6:
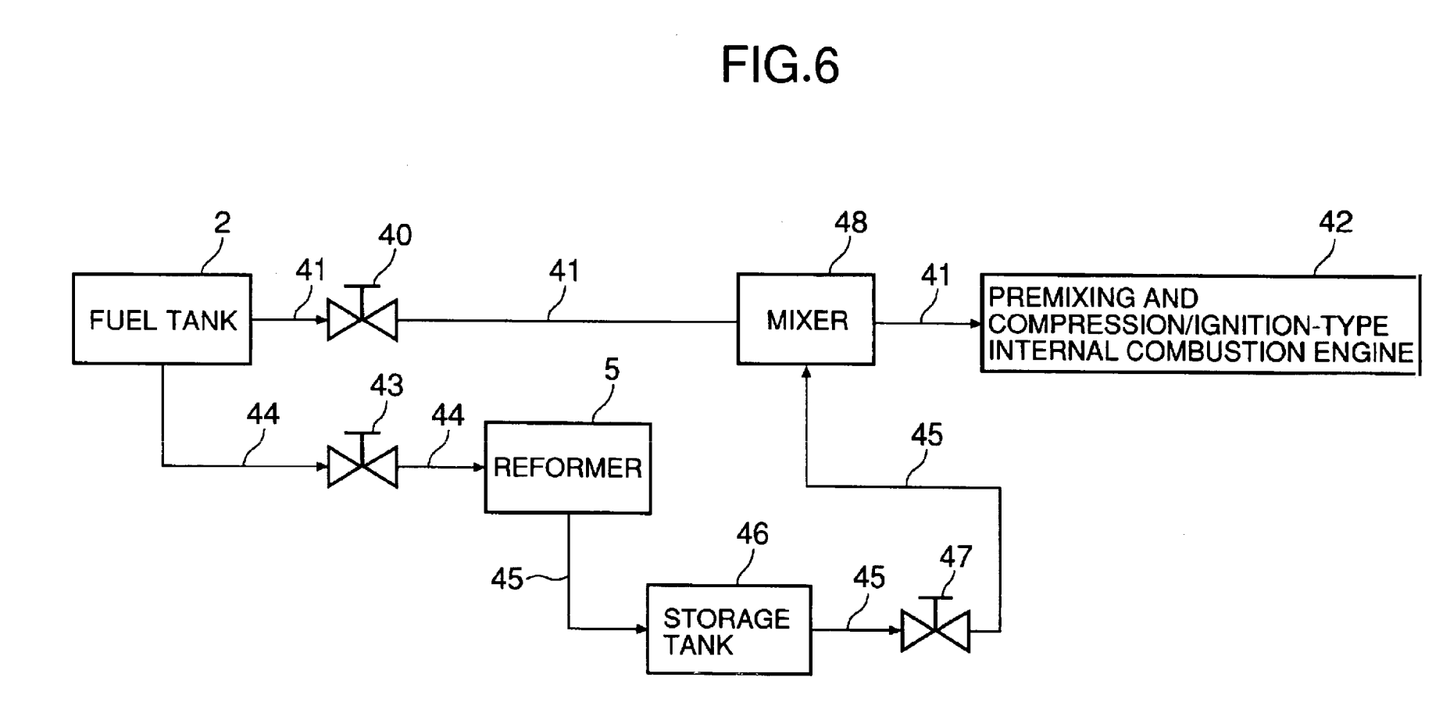
FIG. 6 is a schematic diagram of the fuel supplying system according to another example of the third embodiment.

Another example of the third embodiment of the fuel supplying system is shown in FIG. 6, which is similar to the example shown in FIG. 5, except that it further includes a storage tank 46 for temporarily storing a reformed liquid fuel and a third regulator valve 47 sequentially provided on the third feed pipe 45 from the reformer 5, as in the system shown in FIG. 4. The arrangement of the other components is the same as in the system shown in FIG. 5.

If the system is arranged in the this manner, it is possible to store a liquid fuel having a high octane value and to supply a liquid fuel mixture having an unreformed liquid fuel and the liquid fuel having the high octane value to the premixing and compression/ignition-type internal combustion engine 42. The amount of the reformed liquid fuel supplied to the premixing and compression/ignition-type internal combustion engine 42 is regulated by the third regulator valve 47.

In this case, the first regulator valve 40, the first feed pipe 41, and the mixer 48 form a device for supplying the unreformed liquid fuel to the premixing and compression/ignition-type internal combustion engine 42. In addition, the third feed pipe 45, the storage tank 46, the third regulator valve 47, the mixer 48, and a portion of the first feed pipe 41 form a device for supplying the liquid fuel having the high octane value as a fuel to the premixing and compression/ignition-type internal combustion engine 42.

Further, the amount of unreformed liquid fuel supplied to the premixing and compression/ignition-type internal combustion engine 42 is regulated by the first regulator valve 40. The amount of reformed liquid fuel supplied to the premixing and compression/ignition-type internal combustion engine 42 is regulated by the third regulator valve 47. That is, the valves 40 and 47 are devices for regulating the supplied amounts, respectively. Therefore, the regulating devices perform the functions of increasing the proportion of liquid fuel having a high octane value to be supplied to the premixing and compression/ignition-type internal combustion engine 42, when the engine 42 is operated under a high load, and of decreasing the proportion of liquid fuel having a high octane value to be supplied to the premixing and compression/ignition-type internal combustion engine 42, when the engine 42 is operated under a low load.

What is claimed is:

1. A vehicle that is provided with an internal combustion engine and that performs fuel-reforming/supplying functions, the internal combustion engine comprising:
   a reformer that reforms at least a portion of a liquid fuel by a dehydrogenating cyclization reaction to produce a reformed liquid fuel rich with aromatic hydrocarbon and having a high octane value and to produce a reformed gaseous fuel rich with hydrogen;
   a gas-liquid separator that separates said reformed liquid fuel and said reformed gaseous fuel from each other;

a reformed liquid fuel supplying device that supplies at least a portion of said reformed liquid fuel as a fuel to the internal combustion engine; and a reformed gaseous fuel supplying device that supplies at least a portion of said reformed gaseous fuel to a gas burning-type heater of said reformer.

2. A vehicle according to claim 1, wherein crystalline aluminosilicate is used as a catalyst in the dehydrogenating cyclization reaction.

3. A vehicle according to claim 2, wherein said crystalline aluminosilicate has a MFI structure.

4. A vehicle according to claim 3, wherein said crystalline aluminosilicate includes at least one element selected from gallium, zinc, and platinum.

5. A vehicle that performs fuel-reforming/supplying functions, the vehicle comprising:

a premixing and compression/ignition-type internal combustion engine in which a mixture comprising an oxygen-containing gas and a fuel is compressed and self-ignited;

a liquid fuel supplying device that supplies a liquid fuel which is not reformed to said premixing and compression/ignition-type internal combustion engine;

a reformer that reforms said liquid fuel by a dehydrogenating cyclization reaction to produce a liquid fuel rich with aromatic hydrocarbon and having a high octane value: and a high octane liquid fuel supplying device that supplies said liquid fuel having the high octane value as a fuel to said premixing and compression/ignition-type internal combustion engine, wherein said regulating device increases a proportion of said liquid fuel having the high octane value supplied to said premixing and compression/ignition-type internal combustion engine when said engine is operated under a high load, and decreases the proportion of said liquid fuel having the high octane value supplied to said premixing and compression/ignition-type internal combustion engine when said engine is operated under a low load.

6. A vehicle according to claim 5, further comprising a regulating device that regulates an amount of said liquid fuel which is not reformed to be supplied to said premixing and compression/ignition-type internal combustion engine and an amount of the reformed liquid fuel to be supplied to said premixing and compression/ignition-type internal combustion engine, respectively.

7. A vehicle according to claim 5, wherein crystalline aluminosilicate is used as a catalyst in said dehydrogenating cyclization reaction.

8. A vehicle according to claim 7, wherein said crystalline aluminosilicate has an MFI structure.

9. A vehicle according to claim 8, wherein said crystalline aluminosilicate includes at least one element selected from gallium, zinc, and platinum.

* * * * *